US012566397B2

(12) United States Patent
Delst et al.

(10) Patent No.: US 12,566,397 B2
(45) Date of Patent: Mar. 3, 2026

(54) ELECTROSTATIC PRINTING METHOD

(71) Applicant: VIAVI SOLUTIONS INC., San Jose, CA (US)

(72) Inventors: Cornelis Jan Delst, Fairfax, CA (US); Vladimir P. Raksha, Santa Rosa, CA (US); Alberto Argoitia, Santa Rosa, CA (US); Paul Thomas Kohlmann, Windsor, CA (US)

(73) Assignee: VIAVI SOLUTIONS INC., Chandler, AZ (US)

( * ) Notice: Subject to any disclaimer, the term of this patent is extended or adjusted under 35 U.S.C. 154(b) by 0 days.

(21) Appl. No.: 17/507,537

(22) Filed: Oct. 21, 2021

(65) Prior Publication Data

US 2023/0129906 A1 Apr. 27, 2023

(51) Int. Cl.
*G03G 15/00* (2006.01)
*G03G 9/087* (2006.01)

(52) U.S. Cl.
CPC ......... *G03G 15/5041* (2013.01); *G03G 9/087* (2013.01); *G03G 15/758* (2013.01)

(58) Field of Classification Search
CPC ......................... G03G 15/758; G03G 15/5041
See application file for complete search history.

(56) References Cited

U.S. PATENT DOCUMENTS 3,795,011 A 2/1974 Ohta
4,175,958 A * 11/1979 Naganuma ............ G03G 13/26 430/100
4,178,850 A * 12/1979 Helmig .................. B41N 10/02 101/142
4,242,428 A 12/1980 Davis
4,286,031 A 8/1981 Kuehnle et al.
4,448,867 A 5/1984 Ohkubo et al.
4,448,870 A 5/1984 Imai et al.
4,457,980 A 7/1984 Daniels et al.
4,859,557 A 8/1989 Detig et al.
5,019,472 A 5/1991 Benack et al.
(Continued)

FOREIGN PATENT DOCUMENTS

AU 2012100985 A4 7/2012
CN 100516145 C 7/2009
(Continued)

OTHER PUBLICATIONS

Chapter 6.4 Electrophotographic Process, Graphic Communications Open Textbook Collective. (2015). Graphic Design and Print Production Fundamentals. Victoria, B.C .: BCcampus. (Year 2015), 10 pages.Retrieved from (https://courses.lumenlearning.com/suny-graphicdesign/chapter/6-4-electrophotographic-process/).
(Continued)

*Primary Examiner* — Walter L Lindsay, Jr.
*Assistant Examiner* — Andrew V Do
(74) *Attorney, Agent, or Firm* — Mannava & Kang, P.C.

(57) ABSTRACT

A method of printing a toner, including: rotating a cylinder having a printing plate with a fixed pattern; transferring a toner from a vessel onto the fixed pattern of the printing plate, in which the toner includes a pigment with a metallic reflective layer; and transferring the toner onto a substrate; in which the fixed pattern defines select portions of an image; and in which the toner correlates to the selected portions of the image is disclosed.

18 Claims, 2 Drawing Sheets

(56) References Cited

U.S. PATENT DOCUMENTS

| | | | |
|---|---|---|---|
| 5,180,650 | A | 1/1993 | Sacripante et al. |
| 5,744,269 | A | 4/1998 | Bhattacharya et al. |
| 5,759,636 | A | 6/1998 | Taylor et al. |
| 6,020,908 | A | 2/2000 | Moledina |
| 6,321,049 | B1 | 11/2001 | Endoh |
| 6,578,478 | B2 | 6/2003 | Doppler |
| 6,590,600 | B2 | 7/2003 | Haas |
| 6,643,032 | B1 | 11/2003 | Crean et al. |
| 7,121,209 | B2 | 10/2006 | Vaidyanathan et al. |
| 7,164,498 | B2 | 1/2007 | Van Bael |
| 7,399,351 | B2 | 7/2008 | Jackson et al. |
| 7,433,635 | B2 | 10/2008 | Chou et al. |
| 7,592,117 | B2 | 9/2009 | Jackson et al. |
| 7,678,523 | B2 | 3/2010 | Hiroko et al. |
| 8,025,952 | B2 | 9/2011 | Raksha et al. |
| 8,033,477 | B2 | 10/2011 | Jones et al. |
| 8,211,225 | B2 | 7/2012 | Hollman et al. |
| 8,614,039 | B2 | 12/2013 | Nair et al. |
| 8,859,176 | B2 | 10/2014 | Kodokura et al. |
| 8,895,219 | B2 * | 11/2014 | Ganapathiappan .... G03G 9/125 523/210 |
| 9,019,514 | B2 | 4/2015 | Rich et al. |
| 9,070,075 | B2 | 6/2015 | Barndt et al. |
| 9,316,993 | B2 | 4/2016 | Veres et al. |
| 9,323,175 | B2 | 4/2016 | Hirai et al. |
| 9,383,669 | B2 | 7/2016 | Takahashi et al. |
| 9,497,356 | B1 | 11/2016 | Pjanic et al. |
| 9,544,467 | B2 | 1/2017 | Chen et al. |
| 9,557,674 | B2 | 1/2017 | Hirai et al. |
| 9,579,879 | B2 | 2/2017 | Raksha et al. |
| 9,618,868 | B2 | 4/2017 | Tyagi et al. |
| 9,791,797 | B2 | 10/2017 | Sambhy et al. |
| 10,343,436 | B2 | 7/2019 | Raksha et al. |
| 11,193,002 | B2 | 12/2021 | Raksha et al. |
| 11,230,127 | B2 | 1/2022 | Raksha et al. |
| 2003/0202193 | A1 | 10/2003 | Yokochi |
| 2003/0210318 | A1 | 11/2003 | Detig |
| 2005/0094212 | A1 | 5/2005 | Asai et al. |
| 2005/0094265 | A1 | 5/2005 | Wang |
| 2005/0214666 | A1 * | 9/2005 | Schulze-Hagenest .... C09C 1/62 430/108.4 |
| 2006/0023327 | A1 | 2/2006 | Coombs et al. |
| 2006/0082844 | A1 | 4/2006 | White |
| 2006/0191437 | A1 | 8/2006 | Mader |
| 2006/0222393 | A1 | 10/2006 | De Jong |
| 2009/0214833 | A1 | 8/2009 | Oyanagi et al. |
| 2010/0027035 | A1 * | 2/2010 | Stelter ................ G03G 15/0131 358/1.9 |
| 2010/0231631 | A1 | 9/2010 | Hosaka et al. |
| 2011/0139025 | A1 | 6/2011 | Kitakami |
| 2011/0170037 | A1 | 7/2011 | Nirmal et al. |
| 2011/0255134 | A1 | 10/2011 | Shigeta et al. |
| 2011/0262858 | A1 | 10/2011 | Nair et al. |
| 2012/0113367 | A1 | 5/2012 | Kitson et al. |
| 2013/0070268 | A1 | 3/2013 | Yoshida et al. |
| 2013/0295502 | A1 | 11/2013 | Tyagi et al. |
| 2013/0323633 | A1 * | 12/2013 | Takahashi ............ G03G 9/1139 430/108.1 |
| 2013/0328995 | A1 | 12/2013 | Lazzari et al. |
| 2014/0090579 | A1 | 4/2014 | Delst et al. |
| 2014/0362443 | A1 | 12/2014 | Markantes et al. |
| 2015/0042702 | A1 | 2/2015 | Jiang et al. |
| 2015/0070738 | A1 | 3/2015 | Itoh |
| 2015/0138641 | A1 | 5/2015 | Delst et al. |
| 2015/0183258 | A1 | 7/2015 | Raymond et al. |
| 2015/0352882 | A1 | 12/2015 | Jolic |
| 2016/0009075 | A1 | 1/2016 | Lefebvre et al. |
| 2016/0034795 | A1 | 2/2016 | Morovic et al. |
| 2016/0107471 | A1 | 4/2016 | Landrock et al. |
| 2016/0182764 | A1 | 6/2016 | Akasaka et al. |
| 2018/0017877 | A1 | 1/2018 | Kaiser |
| 2018/0134062 | A1 | 5/2018 | Hansen et al. |
| 2018/0178577 | A1 | 6/2018 | Lister |
| 2018/0273777 | A1 | 9/2018 | Lefebvre et al. |
| 2019/0023051 | A1 | 1/2019 | Kusaka et al. |
| 2019/0225006 | A1 | 7/2019 | Kohlmann et al. |
| 2019/0299336 | A1 | 10/2019 | Nashner |
| 2019/0299691 | A1 | 10/2019 | Raksha et al. |
| 2020/0021846 | A1 | 1/2020 | Thoreau et al. |
| 2020/0079102 | A1 | 3/2020 | Ochiai et al. |
| 2020/0299529 | A1 | 9/2020 | Lahr et al. |
| 2021/0043128 | A1 | 2/2021 | Kubota |
| 2021/0102072 | A1 | 4/2021 | Witzman et al. |
| 2021/0347193 | A1 | 11/2021 | James et al. |
| 2022/0286582 | A1 | 9/2022 | Mizuno et al. |
| 2023/0128872 | A1 | 4/2023 | Delst et al. |
| 2023/0129015 | A1 | 4/2023 | Delst et al. |
| 2023/0153557 | A1 | 5/2023 | Delst |

FOREIGN PATENT DOCUMENTS

| | | | |
|---|---|---|---|
| EP | 1640160 | A1 | 3/2006 |
| EP | 3421551 | A1 | 1/2019 |
| JP | H06214440 | | 8/1994 |
| JP | 2000258929 | | 9/2000 |
| JP | 2008221642 | A | 9/2008 |
| JP | 2009056625 | A | 3/2009 |
| JP | 4478721 | B2 | 6/2010 |
| JP | 2012224017 | A | 11/2012 |
| JP | 5949166 | B2 | 7/2016 |
| JP | 2019142168 | A | 8/2019 |
| WO | 2006041658 | A1 | 4/2006 |
| WO | 2016124315 | A1 | 8/2016 |
| WO | WO-2018/024760 | A1 | 2/2018 |
| WO | 2020174153 | A1 | 9/2020 |
| WO | 2021018771 | A1 | 2/2021 |

OTHER PUBLICATIONS

Hangzhou Epsilon Chemical Co., Ltd, Iron oxide blue (General grade iron oxide), year 2016, 3 pages.

L. Comelissen & Son, "Cadmium Red Pigment", year 2011, 2 pages.

"Examination Report of Bangladesh Patent Application No. BD-P-2022-332", mailed date Nov. 25, 2025, 1 page.

INPI Argentina, "Machine English translation of Search Report for Argentina Application No. 20220102836", dated Nov. 11, 2025, 8 pages.

* cited by examiner

ELECTROSTATIC PRINTING METHOD

FIELD OF THE INVENTION

The present disclosure generally relates to a method of printing an electrically charged toner, comprising: rotating a cylinder having a printing plate with a fixed pattern; transferring a toner from a vessel onto the fixed pattern of the printing plate, wherein the toner includes a pigment with a metallic reflective layer; and transferring the toner onto a substrate; wherein the fixed pattern defines select portions of an image; and wherein the toner correlates to the selected portions of the image.

BACKGROUND OF THE INVENTION

Color laser printers are used with toners to produce reproducible color images in an electrophotographic imaging process. This process uses the subtractive primaries cyan, magenta, yellow, (CMY) with an optional black toner (K), printed on a white substrate to produce an image. If it is desired to print on a black or other dark colored substrate, then a solid white ink must be printed first to create white. The brightness of the image is never more than the brightness of the background lightness as the color is subtractive to that level, and the toner is transparent.

In order to increase the brightness, non-spherical metallic pigments that act as highly reflective little mirrors, which have a much higher reflectivity than paper or other commonly used white substrates have been used. However, when metallic pigments are placed into a vehicle, such as a solvent to create an ink, it is not possible to determine how the metallic pigment will align in the ink and at what angle the reflection will be. The variation in the angles of the aligned metallic pigments would dilute the reflective properties as the reflection from the metallic pigment is highly specular.

In an effort to minimize the variation in the angles, prior methods have evaporated the solvent from the ink. However, the inclusion of the solvent evaporation step increased the production time, and added a drying tunnel to the printing system. Additionally, the use of solvents, generally, invokes safety, environmental and health concerns. Using radiation cured inks (UV, E-beam), resulted in a relatively thick, cured ink layer with pigment at many angles relative to the substrate.

When printing multiple pigments in tight registration, the use of a drying tunnel and a large distance between print stations makes it highly likely that the second print step will be mis-registered and will overlap with at least a portion of the first printed area. This is especially problematic with a sheet fed printing process because it is very difficult to get the sheet aligned in exactly the right position for the next print step. When using opaque, metallic pigments, this overlap of print could result in color errors, unlike with transparent toners.

What is needed for high volume printing is a method of printing a toner in which the toner includes a pigment with a metallic reflective layer. The toner can avoid the use of solvents, and the need for drying of a solvent. In this manner, with fusing of the toner to the substrate taking far less space than a solvent drying process, the likelihood of mis-registration between different toners can be minimized and/or avoided. Multiple subsequent print steps can be done with very little distance in between. Further, the method can produce an image with specular, metallic, light reflection, which cannot be achieved with the use of transparent toners.

BRIEF DESCRIPTION OF THE DRAWINGS

Features of the present disclosure are illustrated by way of example and not limited in the following figure(s), in which like numerals indicate like elements, in which.

SUMMARY OF THE INVENTION

In an aspect, there is disclosed a method of printing a toner, comprising: rotating a cylinder having a printing plate with a fixed pattern; transferring a toner from a vessel onto the fixed pattern of the printing plate, wherein the toner includes a pigment with a metallic reflective layer; and transferring the toner onto a substrate; wherein the fixed pattern defines select portions of an image; and wherein the toner correlates to the selected portions of the image.

Additional features and advantages of various embodiments will be set forth, in part, in the description that follows, and will, in part, be apparent from the description, or can be learned by the practice of various embodiments. The objectives and other advantages of various embodiments will be realized and attained by means of the elements and combinations particularly pointed out in the description herein.

DETAILED DESCRIPTION OF THE INVENTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Additionally, the elements depicted in the accompanying figures may include additional components and some of the components described in those figures may be removed and/or modified without departing from scopes of the present disclosure. Further, the elements depicted in the figures may not be drawn to scale and thus, the elements may have sizes and/or configurations that differ from those shown in the figures.

It is to be understood that both the foregoing general description and the following detailed description are exemplary and explanatory only, and are intended to provide an explanation of various embodiments of the present teachings. In its broad and varied embodiments, disclosed herein are a printing machine, a toner for use in the printing machine, and a method of printing an electrically charged toner.

Figure 1:
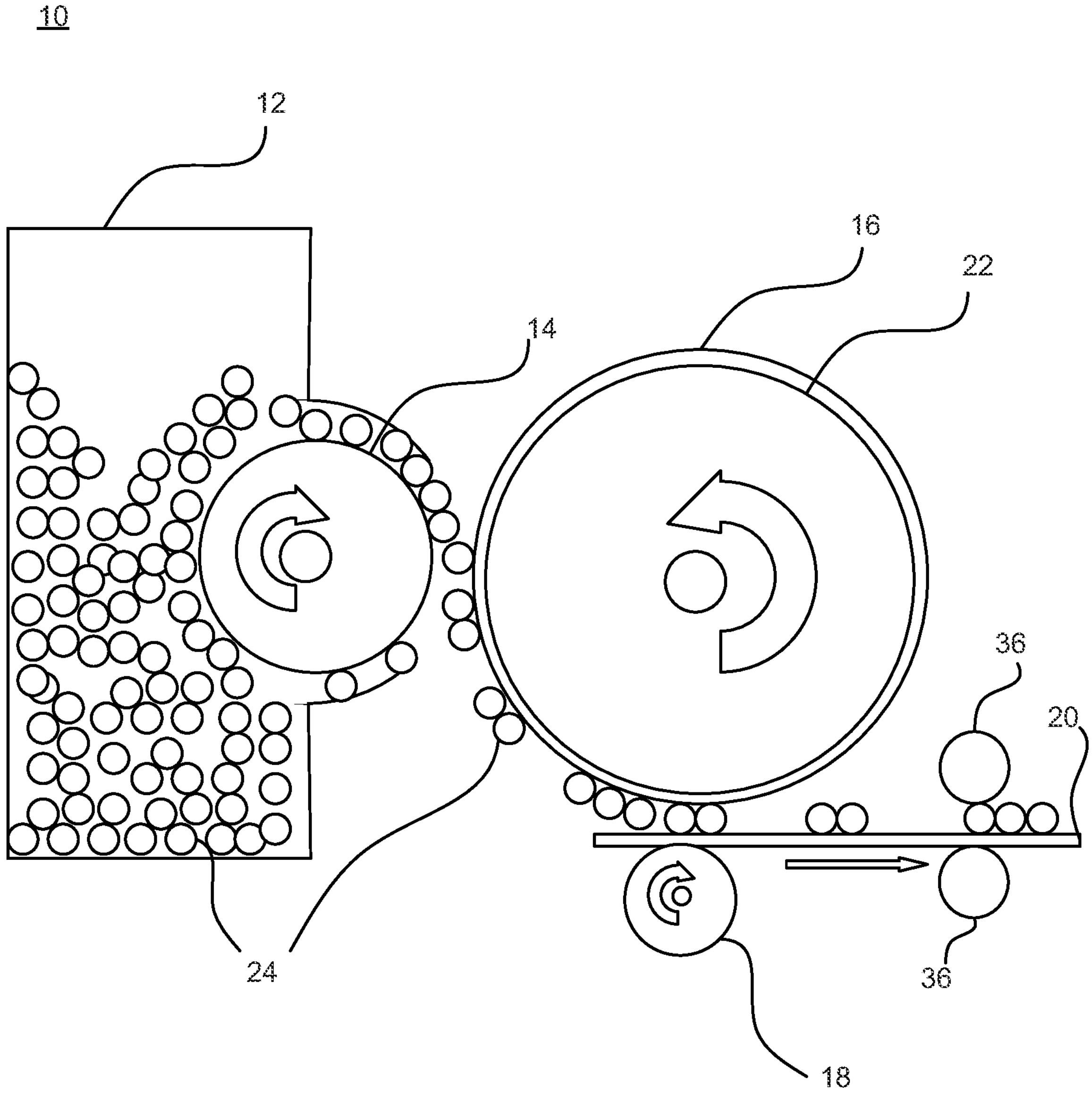
FIG. 1 illustrates a printing machine according to an aspect of the invention.

As shown in FIG. 1, the method of printing a toner can include rotating a cylinder 22 having a printing plate 16 with a fixed pattern; transferring a toner 24 from a vessel 12 onto the fixed pattern of the printing plate 16, wherein the toner 24 includes a pigment with a metallic reflective layer; and transferring the toner 24 onto a substrate 20; wherein the fixed pattern defines select portions of an image; and wherein the toner 24 correlates to the selected portions of the image. The method and the printing machine 10 will be discussed more fully with regard to the FIG. 1 below.

The toner 24 can include a pigment, such as a metallic pigment, with a metallic reflective layer. The terms "metallic" or "metallic layer" used herein, unless otherwise stated, are intended to include all metals, metal blends and alloys, pure metal or metal alloy containing materials, compound, compositions, and/or layers. The pigment can be opaque. The pigment in the toner 24 and/or the pigment is not a mica flake coated with titanium dioxide and comprises an opaque pigment, with less than 50% transmission over the visible spectrum. The metallic reflective layer can include metals and/or metal alloys. In one example, any materials that have reflective characteristics can be used. Non-limiting examples of a material with reflecting characteristics include aluminum, silver, copper, gold, platinum, tin, titanium, palladium, nickel, cobalt, rhodium, niobium, chromium, and compounds, combinations or alloys thereof. Examples of suitable reflective alloys and compounds include bronze, brass, titanium nitride, and the like, as well as alloys of the metals listed above such as silver-palladium. The metallic reflective layer can have an inherent color such as copper, gold, silver copper alloys, brass, bronze, titanium nitride, and compounds, combinations or alloys thereof. The pigment can be encapsulated with a non-conductive layer, such as an organic polymer or metal oxide.

The pigment can be a color shifting pigment. A color shifting pigment can exhibit a first color at a first viewing angle and a second color at a second viewing angle that is different from the first viewing angle. A color shifting pigment can include the following multilayered optical structure: absorber layer/dielectric layer/reflective layer/dielectric layer/absorber layer. The reflective layer can be the metallic reflective layer discussed above.

The dielectric layer can act as a spacer in the pigment. The dielectric layer can be formed to have an effective optical thickness for a particular wavelength. The dielectric layer can be optionally clear, or can be selectively absorbing so as to contribute to the color effect of a pigment. The optical thickness is a well-known optical parameter defined as the product nd, where $\eta$ is the refractive index of the layer and d is the physical thickness of the layer. Typically, the optical thickness of a layer is expressed in terms of a quarter wave optical thickness (QWOT) that is equal to $4\eta rf/\lambda$, where $\lambda$ is the wavelength at which a QWOT condition occurs. The optical thickness of the dielectric layer can range from about 2 QWOT at a design wavelength of about 400 nm to about 9 QWOT at a design wavelength of about 700 nm, and for example about 2-6 QWOT at 400-700 nm, depending upon the color shift desired. The dielectric layer can have a physical thickness of about 100 nm to about 800 nm, and for example from about 140 nm to about 650 nm, depending on the color characteristics desired.

Suitable materials for a dielectric layer include those having a "high" index of refraction, defined herein as greater than about 1.65, as well as those have a "low" index of refraction, which is defined herein as about 1.65 or less. The dielectric layer can be formed of a single material or with a variety of material combinations and configurations. For example, the dielectric layer can be formed of only a low index material or only a high index material, a mixture or multiple sublayers of two or more low index materials, a mixture or multiple sublayers of two or more high index materials, or a mixture or multiple sublayers of low index and high index materials. In addition, the dielectric layer can be formed partially or entirely of high/low dielectric optical stacks. When a dielectric layer is formed partially with a dielectric optical stack, the remaining portion of the dielectric layer can be formed with a single material or various material combinations and configurations as described above.

Non-limiting examples of suitable high refractive index materials for the dielectric layer include zinc sulfide (ZnS), zinc oxide (ZnO), zirconium oxide ($ZrO_2$), titanium dioxide ($TiO_2$), diamond-like carbon, indium oxide ($InO_3$), indium-tin-oxide (ITO), tantalum pentoxide ($Ta_2O_5$), cerium oxide ($CeO_2$), yttrium oxide ($Y_2O_3$), europium oxide ($Eu_2O_3$), iron oxides such as (II)diiron(III) oxide ($FeO_4$) and ferric oxide ($Fe_2O$), hafnium nitride (HfN), hafnium carbide (HfC), hafnium oxide ($HfO_2$), lanthanum oxide ($La_2O_3$), magnesium oxide (MgO), neodymium oxide ($Nd_2O_3$), praseodymium oxide ($Pr_6O_{11}$), samarium oxide ($Sm_2O_3$), antimony trioxide ($Sb_2O_3$), silicon monoxide (SiO), selenium trioxide ($Se_2O_3$), tin oxide ($SnO_2$), tungsten trioxide (WO), combinations thereof, and the like.

Non-limiting examples of suitable low refractive index materials for the dielectric layer includes silicon dioxide ($SiO_2$), aluminum oxide ($Al_2O_3$), metal fluorides such as magnesium fluoride ($MgF_2$), aluminum fluoride ($AlF_3$), cerium fluoride ($CeF_3$), lanthanum fluoride ($LaF_3$), sodium aluminum fluorides (e.g., $Na_3AlF_6$, $Na_5Al_3F_{14}$), neodymium fluoride ($NdF_3$), samarium fluoride ($SmF_3$), barium fluoride ($BaF_2$), calcium fluoride ($CaF_2$), lithium fluoride (LiF), combinations thereof, or any other low index material having an index of refraction of about 1.65 or less. For example, organic monomers and polymers can be utilized as low index materials, including dienes or alkenes such as acrylates (e.g., methacrylate), perfluoroalkenes, polytetrafluoroethylene (Teflon), fluorinated ethylene propylene (FEP), combinations thereof, and the like.

The absorber layer can include any absorber material, including both selective absorbing materials and nonselective absorbing materials. For example, the absorber layer can be formed of nonselective absorbing metallic materials deposited to a thickness at which the absorber layer is at least partially absorbing, or semi-opaque. An example of a non-selective absorbing material can be a gray metal, such as chrome or nickel. An example of a selective absorbing material can be copper or gold. In an aspect, the absorbing material can be chromium. Non-limiting examples of suitable absorber materials include metallic absorbers such as chromium, aluminum, silver, nickel, palladium, platinum, titanium, vanadium, cobalt, iron, tin, tungsten, molybdenum, rhodium, niobium, carbon, graphite, silicon, geranium, cermet and various combinations, mixtures, compounds, or alloys of the above absorber materials that may be used to form the absorber layer.

Examples of suitable alloys of the above absorber materials can include Inconel (Ni—Cr—Fe), stainless steels, Hastalloys (Ni—Mo—Fe; Ni—Mo—Fe—Cr; Ni—Si—Cu) and titanium-based alloys, such as titanium mixed with carbon (Ti/C), titanium mixed with tungsten (Ti/W), titanium mixed with niobium (Ti/Nb), and titanium mixed with silicon (Ti/Si), and combinations thereof. Other examples of suitable compounds for the absorber layer include titanium-based compounds such as titanium silicide ($TiSi_2$), titanium boride ($TiB_2$), and combinations thereof. Alternatively, the absorber layer can be composed of a titanium-based alloy disposed in a matrix of Ti, or can be composed of Ti disposed in a matrix of a titanium-based alloy.

The pigment can be a broad-spectrum reflective pigment. In one example, the materials for the metallic reflective layer can include any materials that have reflective characteristics in the desired spectral range. For example, any material with a reflectance ranging from 50% to 100% in the desired spectral range. An example of a reflective material can be aluminum, which has good reflectance characteristics, is inexpensive, and easy to form into or deposit as a thin layer. Other materials can also be used in place of aluminum. For example, copper, silver, gold, platinum, palladium, nickel, cobalt, niobium, chromium, tin, and combinations, blends or alloys of these or other metals can be used as reflective materials. In an aspect, the material for the reflector layer can be a white or light colored metal. In other examples, the reflector layer can include, but is not limited to, the transition and lanthanide metals and combinations thereof; as well as metal carbides, metal oxides, metal nitrides, metal sulfides, a combination thereof, or mixtures of metals and one or more of these materials.

A broad spectrum reflective pigment can reflect light in multiple spectral ranges, such as visible light (from about 380 nm to about 800 nm), ultraviolet light (from about 200 nm to about 400 nm), and infrared light (from about 800 nm to about 1 mm). The infrared wavelength range can include near infrared, short-wave infrared, medium wave infrared, and long wave infrared. The visible light can include violet (from about 380 nm to about 450 nm), blue (from about 450 nm to about 495 nm), green (from about 495 nm to about 570 nm), yellow (from about 570 nm to about 590 nm), orange (from about 590 nm to about 620 nm), and red (from about 620 nm to about 750 nm).

The pigment can be encapsulated with a layer of a non-conductive material. The non-conductive material can have an immobile surface charge that can exert a charge on an item, such as another pigment or a printing plate 16, with a different surface charge. In an aspect, the pigment can be encapsulated with a layer of a non-conductive, triboelectric material. Non-limiting examples of a negative triboelectric material include natural rubber, sulfur, acetate, polyester, celluloid, urethane, vinyl, fluoroelastomer, polytetrafluoroethylene, silicon, polyethylene, and combinations thereof. Non-limiting examples of a positive triboelectric material include gelatin, wood, paper, cottonwool, nylon, metal oxides, metal islands, glass, and combinations thereof. Conventional methods for encapsulating a pigment can be used including, but not limited to, vapor deposition processes, such as physical vapor deposition, chemical vapor deposition; fluidized bed; sputtering; liquid coating processes, such as dip coating, In an aspect, the pigment can include a single cavity, such as a single cavity color shifting pigment. In another aspect, the pigment can include a dual cavity, such as a dual cavity color shifting pigment. A "single cavity" is understood to mean the metallic reflective layer, and a dielectric layer, and optionally an absorber layer on a single side of pigment. For example, a single cavity can include the metallic reflective layer with a dielectric layer on each side of the metallic reflective layer. A "dual cavity" is understood to mean the metallic reflective layer, a first dielectric layer, an absorber layer, a second dielectric, and optionally a second absorber layer on a single side of the pigment. For example, the dual cavity can include the following structure, and variations thereof: dielectric/absorber/dielectric/metallic reflective layer/dielectric. The layers in each of the single cavity pigment and the dual cavity pigment are disclosed above.

One of ordinary skill in the art would appreciate that each of the disclosed color shifting pigments can include any number of layers in any order. The disclosed color shifting pigments (single cavity color shifting pigment and/or dual cavity color shifting pigment) can each be symmetric, i.e., have the same layers on each side of the metallic reflective layer. The color shifting pigments (single cavity color shifting pigment and/or dual cavity color shifting pigment) can each be asymmetric, i.e., have different layers on each side of the metallic reflective layer. Additionally, the materials in any particular layer can be the same or different from the materials in any other layer.

The toner 24 can further include nanoparticles of colored material, such as pigments or dyes. Any dye or pigment recognized in the Colour Index™ published by the Society of Dyers and Colourists can be used, such as those with the designation "C.I. Pigment". Non-limiting examples of colored materials include carbon, graphite, perylene, perinone, quinacridone, pyrrole, quinacridonequinone, anthrapyrimidine, anthraquinone, anthanthrone, benzimidazolone, disazo condensation, azo, quinolones, xanthene, azomethine, quinophthalone, indanthrone, phthalocyanine, triarylcarbonium, dioxazine, aminoanthraquinone, isoindoline, diketopyrrolopyrrole, thioindigo, thiazineindigo, isoindolinone, pyranthrone, isoviolanthrone, miyoshi methane, triarylmethane, or mixtures thereof. The organic colored material can also be cobalt green, cobalt blue, Prussian blue, and manganese violet.

The pigment can be present in the toner 24 in a low load, which can result in a lower particle density as compared with full pigment coverage. The pigment loading can be low enough to have an area with complete toner coverage have 5% pigment coverage by area percentage on the substrate. Because the pigment can be visible in specular conditions, it is believed that the pigment can be visible at every angle and can be aligned. The brightness of the pigment in the toner can be too high for all lighting conditions. For this reason, it can be necessary to print the toner 24 with less than full coverage resulting in less than 5% toner coverage by area percentage, for example, less than 4% toner coverage, and as a further example, less than 3% toner coverage by area percentage.

The toner 24 can be a dry powder in which the pigment is combined with a thermoplastic binder in a form of a granulate. In an aspect, the pigment is a single layer of aluminum in a form of a flake. The thermoplastic binder can have a particle size that does not result in particle size-based stratification in the vessel 12. The thermoplastic binder can have a melt temperature that can operate within other variables, such as the fuser unit 36 heating temperature and a melt/burn temperature for the substrate 20. Non-limiting examples of thermoplastic binders include polymers, such as styrene acrylate copolymer, polyester resin, styrene butadiene copolymer, polypropylene, polyethylene, polyvinylchloide, polystyrene, polyethyleneteraphthalate, polytetrafluoroethylene, polymethylmethacrylate, polycarbonate, and combinations thereof. In general, the thermoplastic binder used can be determined by printing properties and functional properties such as adhesion and durability.

With regard to FIG. 1, the printing machine 10, its units, and the toner 24 can be made with non-conductive materials. The printing machine 10 can comprise, a printing plate 16 on a rotating cylinder 22, wherein the printing plate has a fixed pattern that defines a select portion of an image, but not the entire image. The fixed pattern can be permanent. The printing machine 10 can utilize surface charge differentials between units of the printing machine 10 and/or the toner 24 to transfer the toner 24 within the printing machine 10 and onto a substrate 20.

The rotating cylinder 22 can rotate about an axis at a same speed as a substrate 20, a toner roller 14, and a transfer roller 18. If more than one printing machine 10 is used, such as in a printing system 100, then a rotating cylinder 22 in each printing machine 10 can be at a same speed.

The rotating cylinder 22 can include a start position that can be indexed to a substrate 20 position. In this manner, each revolution of the rotating cylinder 22 can be aligned with the substrate 20 position in order to prevent and/or minimize mis-registration of the toner 24 when it is transferred from the printing plate 16 of the rotating cylinder 22 to the substrate 20.

The printing machine 10 can also include a vessel 12 containing the toner 24. In an aspect, the toner 24 can have a negative surface charge.

The printing machine 10 can also include a toner roller 14 for transferring the toner 24 from the vessel 12 to the fixed pattern on the printing plate 16. In an aspect, the method can include applying a charge to the printing plate 16, in which the toner 24 can be respectively attracted to, or repelled from, the printing plate 16 which can have a dissimilar, or similar charge value. For example, the fixed pattern can include two or more areas with different charge values as compared to one another and the toner 24. If the toner 24 has a negative charge, then it can be attracted to an area on the fixed pattern of the printing plate 16 that has a relatively "more positive" charge. It can also be repelled by an area on the fixed pattern of the printing plate 16 that has a relatively "more negative" charge. By "more positive" or "more negative" it is understood to be a degree of comparison, which can be easily determined by comparing the electric charge of two items, such as using a voltmeter or electrometer. This include the situation in which the toner has no charge and is attracted by a surface charge or induced charge on a roller or plate area on a roller or plate; or where it is charged and attracted by an area on a roller or plate with no surface charge or induced charge.

The printing machine 10 can also include a transfer roller 18 for transferring the toner 24 from the fixed pattern on the printing plate 16 to the substrate 20. In an aspect, the method can include applying a second charge to the substrate 20 and/or the transfer roller 18 so that the toner 24 on the fixed pattern of the printing plate 16 can be attracted to the substrate 20. For example, the transfer roller 18 and/or the substrate 20 can include a more positive surface charge as compared to the toner 24 and/or the printing plate 16 on the rotating cylinder 22, so that the toner 24 is transferred from the printing plate 16 to the substrate 20.

The printing machine 10 can include one or more fuser units 36, such as a roller or a machine. The method can include fusing the toner 24 onto the substrate 20. The fuser unit 36 can be a roller chosen from a heat roller, a pressure roller, and combinations thereof. The step of fusing can include heating the toner 24 to a temperature greater than a melt temperature of a thermoplastic binder present in the toner 24. The fusing unit 36 can be as wide as the substrate 20 or can be segmented to heat the substrate 20 selectively.

The printing plate 16 can be made of two or more different non-conductive materials to achieve areas, such as two or more areas, having a different electric surface charge. In an aspect, a second area can include one or more of fluoroelastomer, polytetrafluoroethylene, silicon, polyethylene, so that the second area would have a relatively negative surface charge. A negatively charged toner 24 would not be attracted to the second area of the printing plate 16. A first area of the printing plate 16 can include one or more of metal oxides, metal islands, or glass, so that the first area would have a relatively positive surface charge. A negatively charged toner 24 would be attracted to the first area of the printing plate 16.

Figure 2:
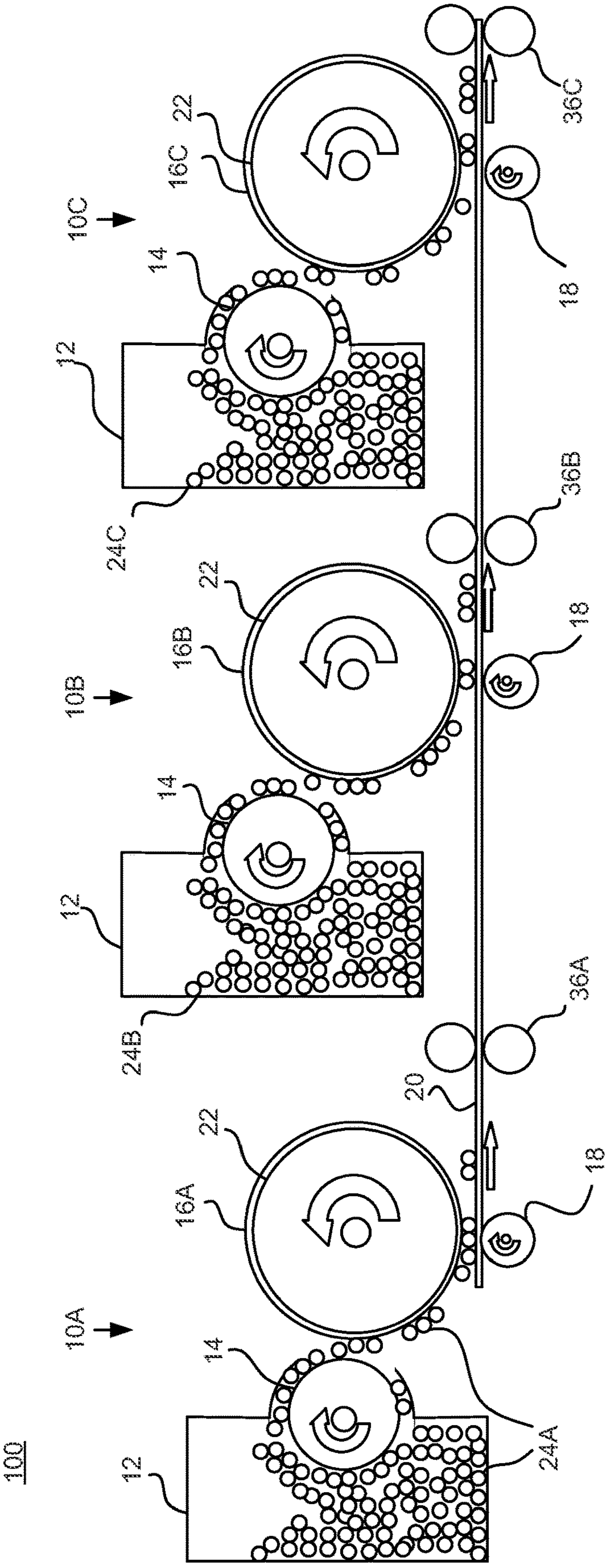
FIG. 2 illustrates a printing system according to an aspect of the invention.

As shown in FIG. 2, there is also disclosed a printing system 100 comprising two or more printing machines 10 arranged serially, in which each printing machine 10 can include a printing plate 16 having a fixed pattern in a form of a select portion of an image; two or more fusing units 36, arranged after each printing machine 10; in which each printing machine 10 prints a select portion of an image, and each fusing unit 36 fuses the printed selected portion of the image.

The first printing machine 10A can print a first portion of an image. The first fusing unit 36A can fuse the first portion of the image to the substrate 20. The substrate 20 with the fused first portion of the image can pass through the second printing machine 10B.

The second printing machine 10B, which can be arranged in series with the first printing machine 10A, can print a second portion of the image, which can be in register with the fused first portion of the image. In this manner, the method can include transferring a second toner 24B onto a second fixed pattern of a second printing plate 16; and transferring the second toner 24B onto the substrate 20. The second fixed pattern can define different select portions of the image, such as different from the first fixed pattern; and the second toner 24B can correlate to the different select portions of the image.

The second toner 24B on the substrate 20 can be in register with the first toner 24A on the substrate 20. The second toner 24B and the first toner 24A can comprise all or a portion of the image. The second toner 24B can be in register with a portion of the first toner 24A.

The second fusing unit 36B can fuse the second portion of the image to the substrate 20. The substrate 20 with the fused first and second portions of the image can pass through the third printing machine 10C. The substrate 20 can include fused first toner 24A and fused second toner 24B, which should not overlap one with another, and can include select portions that are absent any toner 24A, 24B.

The third printing machine 10C, which can be arranged in series with the second printing machine 10B, can print a third portion of the image, which can be in register with the fused first and second toners 24A, 24B of the image. The method can further include transferring a third toner 24C onto a third fixed pattern of a third printing plate 16C; and transferring the third toner 24C onto the substrate 20. The third fixed pattern can define other select portions of the image, such as other portions different from the first fixed pattern and the second fixed pattern; and the third toner 24C can correlate to the other select portions of the image.

The third toner 24C on the substrate 20 can be in register with at least one of the first toner 24A and the second toner 24B on the substrate 20. The third toner 24C, the second toner 24B, and the first toner 24A can comprise all or a portion of the image. The third toner 24C can be in register with a portion of the first toner 24A and/or the second toner 24B.

The third fusing unit 36C can fuse the third portion of the image to the substrate 20. The substrate 20 can include fused first toner 24A, the fused second toner 24B, and the third fused toner 24C, which should not overlap one with another, and can include select portions that are absent any toner 24A, 24B, 24C. In the event that there is overlap between the fused first toner 24A, the fused second toner 24B, and/or the fused third toner 24C, then the overlap can be minimized to reduce a color bias in the image.

If necessary, the printing system 100 can include a fourth printing machine (not shown), which can be used in a similar manner to the first, second, and third printing machines 10A-C.

The first printing machine 10A can include a first toner 24A and a first printing plate 16A, which correspond to a first portion of an image. The second printing machine 10B can include a second toner 24B and a second printing plate 16B, which correspond to a second portion of an image. The third printing machine 10C can include a third toner 24C and a third printing plate 16C, which correspond to a third portion of an image. The first toner 24A, the second toner 24B, and the third toner 24C can be different. The first printing plate 16A, the second printing plate 16B, and the third printing plate 16C can be different. The first portion of the image, the second portion of the image, and the third portion of the image can be different and can be in register one with the other.

The method can produce an image that exhibits a specular, metallic reflection, which under certain light conditions can be too bright, such as with full coverage of the toner 24 and high hiding. The brightness of the image can fall with no specular light reflection, which can be reduced with diffusing over-varnish or additional additives present in the toner 24. The image can exhibit a color shift when viewed off a perpendicular angle, for example, when the viewing angle changes from normal. The image can exhibit extreme color performance From the foregoing description, those skilled in the art can appreciate that the present teachings can be implemented in a variety of forms. Therefore, while these teachings have been described in connection with particular embodiments and examples thereof, the true scope of the present teachings should not be so limited. Various changes and modifications can be made without departing from the scope of the teachings herein.

This scope disclosure is to be broadly construed. It is intended that this disclosure disclose equivalents, means, systems and methods to achieve the devices, activities and mechanical actions disclosed herein. For each device, article, method, mean, mechanical element or mechanism disclosed, it is intended that this disclosure also encompass in its disclosure and teaches equivalents, means, systems and methods for practicing the many aspects, mechanisms and devices disclosed herein. Additionally, this disclosure regards a machine and its many aspects, features and elements. Such a machine can be dynamic in its use and operation, this disclosure is intended to encompass the equivalents, means, systems and methods of the use of the device and/or optical device of manufacture and its many aspects consistent with the description and spirit of the operations and functions disclosed herein. The claims of this application are likewise to be broadly construed. The description of the inventions herein in their many embodiments is merely exemplary in nature and, thus, variations that do not depart from the gist of the invention are intended to be within the scope of the invention. Such variations are not to be regarded as a departure from the spirit and scope of the invention.

What is claimed is:

1. A method of printing a toner, comprising:

rotating a cylinder having a printing plate with a fixed pattern;

transferring a toner from a vessel onto the fixed pattern of the printing plate, wherein the toner is a dry powder, and includes a pigment with a metallic reflective layer; and transferring the toner onto a substrate, wherein the fixed pattern defines select portions of an image, wherein the toner correlates to the select portions of the image, wherein the pigment includes a single cavity or a dual cavity, and wherein the pigment is a color shifting pigment.

2. The method of claim 1, wherein the pigment is a broad spectrum reflective pigment.

3. The method of claim 1, wherein the pigment is encapsulated with a non-conductive layer.

4. The method of claim 1, wherein the toner further comprises nanoparticles of pigments or dyes.

5. The method of claim 1, further comprising applying a charge to the printing plate, wherein the toner is respectively attracted to, or repelled from, the printing plate having a dissimilar, or similar, charge value.

6. The method of claim 1, further comprising applying a second charge to the substrate, wherein the toner on the fixed pattern of the printing plate is attracted to the substrate.

7. The method of claim 1, further comprising fusing the toner onto the substrate.

8. The method of claim 7, wherein the step of fusing includes heating the toner to a temperature greater than a melt temperature of a thermoplastic binder present in the toner.

9. A method of printing a toner, comprising:

rotating a cylinder having a printing plate with a fixed pattern;

transferring a toner from a vessel onto the fixed pattern of the printing plate, wherein the toner is a dry powder, and includes a pigment with a metallic reflective layer;

transferring the toner onto a substrate, wherein the fixed pattern defines select portions of an image, the toner correlates to the select portions of the image, and the pigment includes a single cavity or a dual cavity;

transferring a second toner onto a second fixed pattern of a second printing plate; and transferring the second toner onto the substrate, wherein the second fixed pattern defines different select portions of the image, and the second toner correlates to the different select portions of the image.

10. The method of claim 9, wherein the second toner on the substrate is in register with the toner on the substrate.

11. The method of claim 9, further comprising, transferring a third toner onto a third fixed pattern of a third printing plate; and transferring the third toner onto the substrate;

wherein the third fixed pattern defines other select portions of the image; and the third toner correlates to the other select portions of the image.

12. The method of claim 11, wherein the third toner on the substrate is in register with at least one of the toner on the substrate and the second toner on the substrate.

13. The method of claim 1, wherein the image exhibits a specular, metallic reflection.

14. A method of printing a toner, comprising:

rotating a cylinder having a printing plate with a fixed pattern;

transferring a toner from a vessel onto the fixed pattern of the printing plate, wherein the toner is a dry powder, and includes a pigment with a metallic reflective layer; and transferring the toner onto a substrate, wherein the fixed pattern defines select portions of an image, the toner correlates to the select portions of the image, the pigment includes a single cavity or a dual cavity, and image exhibits a color shift when viewed off a perpendicular angle.

15. The method of claim 1, wherein brightness of the image falls with no specular light reflection.

16. The method of claim 1, further comprising additional additives in the toner to reduce brightness falls.

17. The method of claim 1, wherein the fixed pattern is permanent.

18. A method of printing a toner, comprising:

rotating a cylinder having a printing plate with a fixed pattern;

transferring a toner from a vessel onto the fixed pattern of the printing plate, wherein the toner is a dry powder, and includes a pigment with a metallic reflective layer; and transferring the toner onto a substrate;

wherein the fixed pattern defines select portions of an image;

wherein the toner correlates to the select portions of the image; and wherein the pigment is present in the toner to provide an area with complete toner coverage having 5% pigment coverage by area percentage on the substrate.

* * * * *